Feb. 4, 1941.  W. A. GIBBS  2,230,942
METHOD OF BONING FISH
Filed July 14, 1939
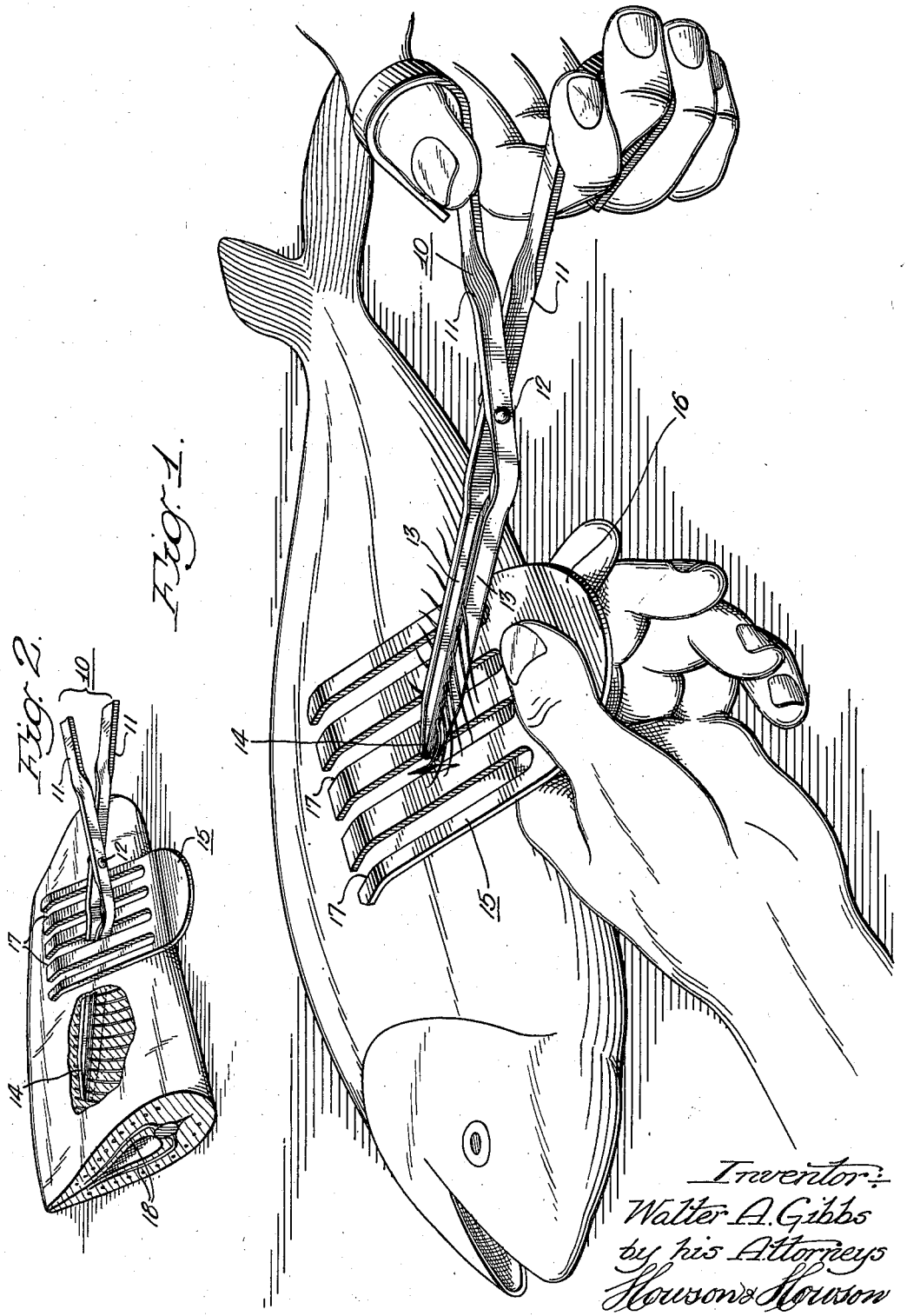

Patented Feb. 4, 1941

2,230,942

UNITED STATES PATENT OFFICE 2,230,942

METHOD OF BONING FISH

Walter A. Gibbs, Holly Oak, Del.

Application July 14, 1939, Serial No. 284,555

7 Claims. (Cl. 17—45)

This invention relates to a method of boning fish, and has as an important object thereof the provision of a method whereby all of the minor bones of a fish, even those having complex bony structures such as shad, may be removed prior to completion of the cooking operation and without destroying the shape or appearance of the fish.

Certain of the bones of a fish as, for example, the rib bones are readily accessible through the body cavity and by use of an apparatus such as that illustrated in my prior application Serial No. 224,379, filed August 11, 1938, for Method and apparatus for removing bones from fish, may be grasped as a unit and removed. Other bones of the fish, particularly in the case of fish such as the shad, are, however, so located that they cannot be removed through the body cavity, and a specific object of this invention is to provide a method of removing these bones. In the normal state these bones adhere firmly to the flesh and, accordingly, any attempt to remove them would tear the flesh severely and destroy the contours of the fish. In accordance with my method the fish, after cleaning, is steamed for a few minutes, five to ten minutes being sufficient for a fish of five or six pounds. While this treatment does not cook the fish to any appreciable extent or destroy its shape or appearance, it results in loosening of the flesh from the bones so that the bones may be much more readily withdrawn.

I then employ an apparatus such as that illustrated in the accompanying drawing wherein:

Fig. 1 is a perspective view illustrating withdrawal of the minor bones of the fish in accordance with my method; and Fig. 2 is a fragmentary perspective partially broken away illustrating the manner of grasping the bones.

As shown in the drawing, I employ a scissor-like clamping extractor 10 such as that illustrated in my copending application above identified, this extractor comprising a pair of pivoted lever elements 11, the ends of the lever elements at one side of the pivot 12 comprising clamping jaws 13 and having their free ends somewhat pointed, as indicated at 14 to facilitate their insertion in the fish through the skin thereof with the formation of the smallest possible incision. The opposite ends of the levers merely constitute gripping portions by means of which the clamping jaws may be manipulated. In combination with a tool of this character I employ a plate 15 one end of which may be formed as a hand grip 16 and the remainder of which is formed to conform to the contours of the fish. This plate has openings 17 therein, through which the grippings jaws 13 are inserted in the fish to grasp the bones.

It will be obvious that the plate will serve to prevent tearing of the flesh and skin of the fish as the implement 10 is withdrawn with the bones in position therein as shown in Fig. 1. The ribs 18 may, of course, be grasped through the body cavity for removal therefrom. Following removal of the bones, the fish may be cooked in any desired manner as, for example, baked, broiled or fried. No claim is made to the structure of the removing apparatus herein described, such structure being claimed in my divisional application filed October 21, 1939, Serial No. 300,620, for Apparatus for boning fish.

While I have hereinbefore described the preparation by preliminary cooking it will, of course, be understood that complete cooking will free the bones so that they may be removed by my method without disintegrating or spoiling the appearance of the fish. It will, therefore, be understood that the preparation referred to in the appended claims contemplates, likewise, complete cooking as well as a preliminary steaming operation or the like.

I claim:

1. The method of removing bones from fish comprising first treating the fish to loosen the flesh from the bones, removing the rib bones through the abdominal cavity of the fish and finally removing floating bones through incisions in the body wall of the fish which are sufficiently small to enable the fish to remain as a substantially unmarred entity.

2. The method of removing bones from fish comprising first treating the fish to loosen the flesh from the bones, removing the rib bones through the abdominal cavity of the fish and finally removing floating bones through small incisions in the body wall of the fish while shielding the body wall against laceration by the withdrawn bones.

3. The method of removing bones from fish comprising lightly steaming the fish to loosen the flesh from the bones, removing the rib bones through the abdominal cavity of the fish and finally removing floating bones through incisions in the body wall of the fish which are sufficiently small to enable the fish to remain as a substantially unmarred entity.

4. The method of removing bones from fish comprising lightly steaming the fish to loosen the flesh from the bones, removing the rib bones through the abdominal cavity of the fish and finally removing floating bones through small incisions in the body wall of the fish while shielding the body wall against laceration by the withdrawn bones.

5. The method of removing bones from fish comprising first treating the fish to loosen the flesh from the bones and then removing the bones through incisions in the body wall of the fish which are sufficiently small to enable the fish to remain as a substantially unmarred entity.

6. The method of removing bones from fish comprising first treating the fish to loosen the flesh from the bones and then removing the bones through small incisions in the body wall of the fish while shielding the body of the fish to prevent breaking up of the fish when the bones are removed.

7. The method of removing bones from fish comprising first treating the fish to loosen the flesh from the bones and removing the bones through the flesh while shielding the fish at the point where the bones are withdrawn through the flesh to prevent external laceration of the body during removal of the bones.

WALTER A. GIBBS.